3,064,041
PROCESS FOR THE PRODUCTION OF AROMATIC DICARBOXYLIC ACIDS
Bruno Blaser, Dusseldorf-Urdenbach, Hubert Schirp, Dusseldorf, and Werner Stein, Dusseldorf-Holthausen, Germany, assignors to Henkel & Cie. G.m.b.H., Dusseldorf-Holthausen, Germany, a corporation of Germany
No Drawing. Filed May 19, 1959, Ser. No. 814,154
Claims priority, application Germany May 24, 1958
14 Claims. (Cl. 260—515)

This invention relates to a method for producing aromatic carboxylic acids from aryl compounds of elements from the third to the sixth group in the periodic table.

It is known to produce certain aromatic carboxylic acids, e.g. terephthalic or trimesic acids by a thermal rearrangement treatment of alkali metal salts of aromatic carboxylic acids having carboxyl groups in another relationship on the aromatic nucleaus, e.g. phthalic, isophthalic, hemimellitic, etc. acids.

It is an object of the present invention to provide a method for producing aromatic carboxylic acids by the thermal treatment of aryl compounds containing no carboxyl groups.

It is a further object to provide a method for producing aromatic carboxylic acids from aryl compounds of elements from groups three to six of the periodic system.

These and other objects of our invention will become apparent as the description thereof proceeds.

We have now found that aromatic carboxylic acids can be prepared by heating aryl compounds of elements of the third to sixth group of the periodic system in the presence of carbon dioxide and acid-binding substances to temperatures above 250° C. and, if desired, converting the salts thus obtained into the free acids. For example, starting with silicon tetraphenyl, if this compound is heated in the presence of carbon dioxide and potassium carbonate to a temperature of about 400° C., potassium terephthalate is obtained. The reaction probably proceeds in accordance with the following schematic formula

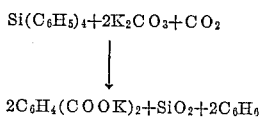

Starting materials for the process according to the invention are aryl compounds of the third to sixth group of the periodic system, such as the phenyl or naphthyl compounds of the elements boron, silicon, germanium, tin, lead, phosphorus, arsenic, antimony, bismuth, selenium and tellurium. The aromatic radicals of these compounds may also carry hydrocarbon substituents. Examples of suitable starting materials are triphenyl boron, tetraphenyl silicon, tetraphenyl tin, diphenyl tin oxide, tetraphenyl lead, triphenyl-phosphine, triphenyl-phosphine oxide, triphenyl-arsine, triphenyl arsine oxide, triphenyl antimony, triphenyl bismuth, diphenyl selenium, and diphenyl tellurium. A few of these compounds, for example tetraphenyl silicon, are technically readily accessible compounds and are therefore preferred as starting materials for the process according to the invention.

As acid-binding agents the carbonates of the alkali metals, especially potassium carbonate, are used. In place of the carbonates the alkali metal salts of other weak acids, such as the bicarbonates, formates or oxalates, may also be used. Similarly, the corresponding compounds of other metals are suitable; for example, the carbonates of the alkaline earth metals. In some cases the structure of the reaction products is dependent upon the acid-binding agents employed. The quantitative ratio of the aryl compounds and the acid-binding agents may vary within wide limits. To achieve good yields it is advantageous to add a quantity of the acid-binding substance which corresponds at least to that required to neutralize the carboxyl groups formed by the reaction. Advantageously, a certain excess is used.

The above-mentioned starting materials are heated in the presence of carbon dioxide, preferably under pressure. The pressure which may be applied has no upper limit. In place of gaseous carbon dioxide, mixtures of carbon dioxide with other inert gases, such as with nitrogen, methane or argon, may be used. The presence of substantial amounts of oxygen should advantageously be avoided. In general, the reaction begins at temperatures above 250° C. The optimum reaction temperature varies depending upon the starting materials used. The upper temperature limit for the process is determined only by the decomposition temperature of the reaction products and, in general, is about 500° C.

The above-described starting materials, if they are solids, are preferably used in a dry and finely divided form and are intimately admixed with each other. In order to achieve as complete a reaction as possible, it is, in some cases, advantageous to maintain the reaction mixture in motion by stirring it or by agitating the reaction vessel.

We have further found that the reaction according to the present invention can be influenced by means of a catalyst. Particularly suitable as catalysts are the metals; zinc, cadmium, mercury, iron or lead as well as various compounds of these metals, such as their oxides or their salts formed with inorganic or organic acids.

The separation of the reaction product is, as a rule, simple. For example, in the above-described preparation of terephthalic acid from tetraphenylsilicon, the reaction mixture may first be freed from unreacted organic starting materials and from any diphenyl which may have formed as a side product with the aid of benzene. Subsequently, the reaction mixture may be dissolved in water and the terephthalic acid may then be precipitated from the solution in a known manner, namely, by acidification with inorganic or organic acids.

In accordance with the process of the invention a number of valuable aromatic carboxylic acids, such as benzoic acid, α- and β-naphthoic acid, terephthalic acid, or trimesic or naphthalene-dicarboxylic acid-2,6- may be obtained from readily accessible starting materials.

The following examples are set forth to enable persons skilled in the art to better understand and practice our invention. However, it will be understood that these examples are given only for the purpose of illustration and explanation, and we do not intend to be limited to the exact materials and conditions recited therein.

*Example I*

A mixture of 27.6 gm. potassium carbonate, 1.0 gm. cadmium fluoride and 20.0 gm. tetraphenylsilicon was heated for 16 hours at 420° C. in an autoclave. Prior to heating, the air in the autoclave was displaced with carbon dioxide, and a sufficient amount of carbon dioxide was introduced into the autoclave by means of a compressor so that a pressure of 700 atmospheres developed at the reaction temperature. After cooling and releasing the pressure from the autoclave, the reaction mixture was dissolved in hot water. The aqueous solution was filtered and the filtrate was acidified at 90° C. with hydrochloric acid. The terephthalic acid precipitated thereby was filtered off while the solution was still hot. The yield was 4.65 gm.

Example II

A mixture of 27.6 gm. potassium carbonate and 25.5 gm. tetraphenylsilicon was heated for 16 hours at 420° C. in an autoclave. Prior to the beginning of the run, the air in the autoclave was displaced with carbon dioxide, and a sufficient amount of carbon dioxide was introduced under pressure so that a pressure of 1100 atmospheres developed at the reaction temperature. After cooling and releasing the pressure from the autoclave, the reaction mixture was treated with benzene in order to extract unreacted tetraphenylsilicon. The insoluble residue was then dissolved in hot water. The aqueous solution was filtered and acidified with hydrochloric acid while still hot. 2.15 gm. terephthalic acid were obtained.

Example III

A mixture of 27.6 gm. potassium carbonate, 6.0 gm. cadmium fluoride and 25.0 gm. triphenylphosphine was heated in an autoclave for 13 hours at 420° C. Prior to the beginning of the run the air in the autoclave was displaced with carbon dioxide, and then a sufficient amount of carbon dioxide was introduced under pressure so that a pressure of 650 atmospheres developed at the reaction temperature. After cooling and releasing the pressure from the autoclave the reaction mixture was dissolved in hot water. The aqueous solution was filtered and acidified with hydrochloric acid. The terephthalic acid precipitated thereby was filtered off while the solution was still hot. The yield was 2.9 gm.

Example IV

A mixture of 13.8 gm. potassium carbonate, 3.0 gm. cadmium fluoride and 21.0 gm. triphenylphosphine oxide was heated in an autoclave for 16 hours at 420° C. Prior to the beginning of the run the air in the autoclave was displaced with carbon dioxide and then a sufficient amount of carbon dioxide was introduced under pressure so that a pressure of 1235 atmospheres developed at the reaction temperature. After cooling and releasing the pressure from the autoclave, the reaction mixture was dissolved in hot water. The aqueous solution was filtered and the filtrate was acidified with hydrochloric acid. The terephthalic acid precipitated thereby was filtered off while the solution was still hot. The yield was 4.4 gm.

Example V

A mixture of 13.8 gm. potassium carbonate, 0.5 gm. cadmium fluoride and 32.0 gm. tetraphenyl tin was heated in 250 cc. benzene in an autoclave having a capacity of 600 cc. for three hours at 420° C. Prior to beginning the run, the air in the autoclave was displaced with carbon dioxide, and then a sufficient amount of carbon dioxide was introduced under pressure so that a pressure of 1230 atmospheres developed at the reaction temperature. After releasing the pressure and cooling the autoclave, the benzene was separated from the solid reaction product, and the latter was dissolved in hot water. The aqueous solution was filtered and the filtrate was acidified with hydrochloric acid. The terephthalic acid precipitated thereby was filtered off while the solution was still hot. The yield was 3.2 gm. By extraction with ether, 1.15 gm. trimesic acid were obtained from the mother liquor.

Example VI

A mixture of 27.6 gm. potassium carbonate, 2.0 gm. cadmium fluoride and 26.0 gm. tetraphenyl lead was heated with 300 cc. benzene in an autoclave for 15 hours at 400° C. Prior to the beginning of the run the air in the autoclave was displaced with carbon dioxide, and then a sufficient amount of carbon dioxide was introduced under pressure so that a pressure of 1125 atmospheres developed at the reaction temperature. After cooling and releasing the pressure from the autoclave the benzene was separated from the solid reaction products; it contained 5.5 gm. diphenyl dissolved therein which were formed by decomposition of the tetraphenyl lead. The remaining reaction products were dissolved in hot water. The aqueous solution was filtered and the filtrate was acidified with hydrochloric acid. The terephthalic acid precipitated thereby was filtered off while the solution was still hot. The yield was 0.7 gm.

Example VII

A mixture of 27.6 gm. potassium carbonate, 1.5 gm. cadmium fluoride and 41.5 gm. tetraphenyl lead was heated in an autoclave having a capacity of 600 cm.$^3$ for 16 hours at 320° C. Prior to the beginning of the run the air in the autoclave was displaced with carbon dioxide. At a temperature of 100° C. additional carbon dioxide was introduced until the pressure reached 700 atmospheres. At the reaction temperature a pressure of 1280 atmospheres developed. The raw reaction product was first boiled with benzene and then with water. The aqueous solution was filtered and the filtrate was acidified with hydrochloric acid. The terephthalic acid precipitated thereby was filtered off and dried. The yield of terephthalic acid was 1.15 gm. The mother liquor was extracted with ether. After evaporation of the ether solution, 6.75 gm. benzoic acid remained behind.

Example VIII

A mixture of 20.7 gm. potassium carbonate, 2.0 gm. cadmium fluoride and 22.0 gm. triphenyl bismuth was heated in an autoclave having a capacity of 600 cc. for 10 hours at 410° C. At the beginning of the heating a sufficient amount of carbon dioxide was introduced under pressure so that a pressure of 1160 atmospheres developed at the reaction temperature. The reaction product was boiled with water. The aqueous solution was filtered and acidified with hydrochloric acid. 5.2 gm. terephthalic acid were obtained.

Example IX

A mixture of 20.7 gm. potassium carbonate, 2.0 gm. cadmium fluoride and 17.7 gm. triphenyl antimony was heated in an autoclave having a capacity of 600 cc. for 16 hours at 400° C. At the beginning of the run a sufficient amount of carbon dioxide was introduced under pressure so that a pressure of 1500 atmospheres developed at the reaction temperature. The raw reaction product was extracted with boiling water. The aqueous solution was filtered and the filtrate was acidified with hydrochloric acid. 1.05 gm. terephthalic acid were obtained.

Example X

A mixture of 27.6 gm. potassium carbonate, 3.0 gm. cadmium fluoride and 30 gm. tetraphenyl lead was heated in an autoclave having a capacity of 600 cc. for 1 hour at 420° C. At the beginning of the run a sufficient amount of carbon dioxide was introduced under pressure so that a pressure of 500 atmospheres developed at the reaction temperature. The raw reaction product was first boiled with benzene and then with water. The aqueous solution was filtered and the filtrate was acidified with hydrochloric acid while still hot. In this manner 4.6 gm. terephthalic acid were obtained.

While we have given specific embodiments and preferred modes of practice of our invention, we wish it to be understood that our invention is not limited to these embodiments and that various changes and modifications may be made without departing from the spirit of the disclosure or the scope of the appended claims.

We claim:

1. A process for the preparation of terephthalic acid which comprises the steps of heating tetraphenyl silicon in the presence of carbon dioxide and alkali metal carbonates as acid-binding substances to temperatures above 250° C. but below the decomposition temperature of the starting material and products, under elevated pressures, and to produce alkali metal terephthalate and acidifying said terephthalate to liberate the free carboxylic acid.

2. The process of claim 1, wherein the acid-binding substance is potassium carbonate.

3. A process for the preparation of terephthalic acid which comprises the steps of heating tetraphenylsilicon in the presence of carbon dioxide and alkali metal carbonates as acid-binding substances to temperatures above 250° C. but below the decomposition temperature of the starting material and products, under elevated pressures, in the presence of a catalyst selected from the group consisting of metallic zinc, cadmium, mercury, iron and lead, oxides thereof, and inorganic and organic salts thereof and treating the product mixture to liberate the free carboxylic acid.

4. The process of claim 3, wherin the acid-binding substance is potassium carbonate.

5. The process of claim 4, wherein the catalyst is cadmium fluoride.

6. The process of claim 3, wherein the starting material is triphenylphosphine.

7. The process of claim 3, wherein the starting material is triphenylphosphine oxide.

8. The process of claim 3, wherein the starting material is tetraphenyl lead.

9. The process of claim 3, wherein the starting material is triphenyl bismuth.

10. A process for the preparation of aromatic carboxylic acids which comprises the steps of heating aryl compounds of elements from groups III to VI of the periodic system, said aryl compounds being selected from the group consisting of di-, tri-, and tetraphenyl, corresponding naphthyl compounds, and corresponding monooxides, in the presence of carbon dioxide and acid-binding substances selected from the group consisting of alkali metal carbonates, bicarbonates, formates and oxalates to temperatures above 250° C. but below the decomposition temperature of the starting material and products, and acidifying the resulting alkali metal salts of aromatic carboxylic acids from the product mixture to liberate the free carboxlyic acid.

11. A process for the preparation of aromatic carboxylic acids which comprises the steps of heating aryl compounds of elements from groups III to VI of the periodic system, said aryl compounds being selected from the group consisting of di-, tri-, and tetraphenyl, corresponding naphthyl compounds, and corresponding monooxides, in the presence of carbon dioxide and acid-binding substances selected from the group consisting of alkali metal carbonates, bicarbonates, formates and oxalates, to temperatures above 250° C. but below the decomposition temperature of the starting material and products under elevated pressures, and acidifying the product mixture to liberate the free carboxylic acid.

12. A process for the preparation of aromatic carboxylic acids which comprises the steps of heating aryl compounds of elements from groups III to VI of the periodic system, said aryl compounds being selected from the group consisting of di-, tri-, and tetraphenyl, corresponding naphthyl compounds, and corresponding monooxides, in the presence of carbon dioxide and acid-binding substances selected from the group consisting of alkali metal carbonates, bicarbonates, formates and oxalates, to temperatures above 250° C. but below the decomposition temperature of the starting material and products, in the presence of a catalyst selected from the group consisting of metallic zinc, cadmium, mercury, iron and lead, oxides thereof, and inorganic and organic salts thereof and acidifying the product mixture to liberate the free carboxylic acid.

13. A process for the preparation of aromatic carboxylic acids which comprises the steps of heating aryl compounds of elements from groups III to VI of the periodic system, said aryl compounds being selected from the group consisting of di-, tri-, and tetraphenyl, corresponding naphthyl compounds, and corresponding monooxides, in the presence of carbon dioxide and alkali metal carbonates as acid-binding substances to temperatures above 250° C. but below the decomposition temperature of the starting material and products, under elevated pressures, and acidifying the resulting alkali metal salts of aromatic carboxylic acids from the product mixture to liberate the free carboxylic acid.

14. A process for the preparation of aromatic carboxylic acids which comprises the steps of heating aryl compounds of elements from groups III to VI of the periodic system, said aryl compounds being selected from the group consisting of di-, tri-, and tetraphenyl, corresponding naphthyl compounds, and corresponding monooxides, in the presence of carbon dioxide and alkali metal carbonates as acid-binding substances to temperatures above 250° C. but below the decomposition temperature of the starting material and products, under elevated pressures, in the presence of a catalyst selected from the group consisting of metallic zinc, cadmium, mercury, iron and lead, oxides thereof, and inorganic and organic salts thereof, and acidifying the resulting alkali metal salts of aromatic carboxylic acids from the product mixture to liberate the free carboxylic acid.

References Cited in the file of this patent

UNITED STATES PATENTS 2,866,815     Schirp _____ Dec. 30, 1958